US011338911B2

(12) United States Patent
Wong

(10) Patent No.: US 11,338,911 B2
(45) Date of Patent: May 24, 2022

(54) MAGNETIC RECOVERY SYSTEMS AND MAGNETIC DOCKING MECHANISMS FOR FIXED-WING UNMANNED AERIAL VEHICLES

(71) Applicant: Insitu, Inc., Bingen, WA (US)

(72) Inventor: John R. Wong, Klickitat, WA (US)

(73) Assignee: Insitu, Inc., Bingen, WA (US)

( * ) Notice: Subject to any disclaimer, the term of this patent is extended or adjusted under 35 U.S.C. 154(b) by 902 days.

(21) Appl. No.: 16/134,458

(22) Filed: Sep. 18, 2018

(65) Prior Publication Data

US 2020/0086981 A1 Mar. 19, 2020

(51) Int. Cl.
*B64C 25/68* (2006.01)
*B64C 39/02* (2006.01)

(52) U.S. Cl.
CPC ............ *B64C 25/68* (2013.01); *B64C 39/024* (2013.01); *B64C 2201/021* (2013.01); *B64C 2201/206* (2013.01)

(58) Field of Classification Search
CPC . B64C 25/68; B64C 39/024; B64C 2201/021; B64C 2201/206; B64C 2201/182; B64D 5/00
See application file for complete search history.

(56) References Cited

U.S. PATENT DOCUMENTS

| 7,815,149 | B1 * | 10/2010 | Howard | B64G 1/646 |
| | | | | 244/172.4 |
| 8,857,754 | B2 * | 10/2014 | Ferrari | B64D 1/22 |
| | | | | 244/2 |
| 10,407,182 | B1 * | 9/2019 | Alcorn | B64F 1/125 |
| 2006/0145023 | A1 * | 7/2006 | Babb | B64G 1/646 |
| | | | | 244/172.4 |
| 2008/0156932 | A1 | 7/2008 | McGeer et al. | |
| 2020/0174129 | A1 * | 6/2020 | Abdelkader | G01N 29/225 |
| 2020/0290752 | A1 * | 9/2020 | Kolosiuk | B60L 53/14 |
| 2020/0324893 | A1 * | 10/2020 | Mills | B64C 37/02 |
| 2020/0350673 | A1 * | 11/2020 | Ligander | H04B 17/18 |
| 2021/0056856 | A1 * | 2/2021 | Ben-David | G08G 5/025 |

OTHER PUBLICATIONS

Lockney, "Magnetic Capture Docking System," NASA Technology Transfer Program, retrieved online Aug. 21, 2018, from [https://technology.nasa.gov/patent/MSC-TOPS-63], 3 pages.

* cited by examiner

*Primary Examiner* — Valentina Xavier
(74) *Attorney, Agent, or Firm* — Hanley, Flight & Zimmerman, LLC

(57) ABSTRACT

Example magnetic recovery systems and magnetic docking mechanisms for fixed-wing UAVs are disclosed herein. An example capture mechanism for an unmanned aerial vehicle (UAV) includes a first member attached to a capture vehicle, the first member having a first portion having a first shape and a magnetic portion; and a second member attached to the UAV, the second member having a second portion having a second shape, wherein the first member and the second member mutually self-align responsive to incidental contact of the first shape and the second shape, and the magnetic portion is to capture the second member.

22 Claims, 6 Drawing Sheets

MAGNETIC RECOVERY SYSTEMS AND MAGNETIC DOCKING MECHANISMS FOR FIXED-WING UNMANNED AERIAL VEHICLES

FIELD OF THE DISCLOSURE

This disclosure relates generally to fixed-wing unmanned aerial vehicles (UAVs) and, more particularly, to magnetic recovery systems and magnetic docking mechanisms for fixed-wing UAVs.

BACKGROUND

UAVs are becoming increasingly popular for many applications. UAVs operate under the remote control of a human operator, and/or autonomously by onboard computers. The increased interest in UAVs has resulted in an increased interest in the launch and recovery of UAVs.

Figure 1:
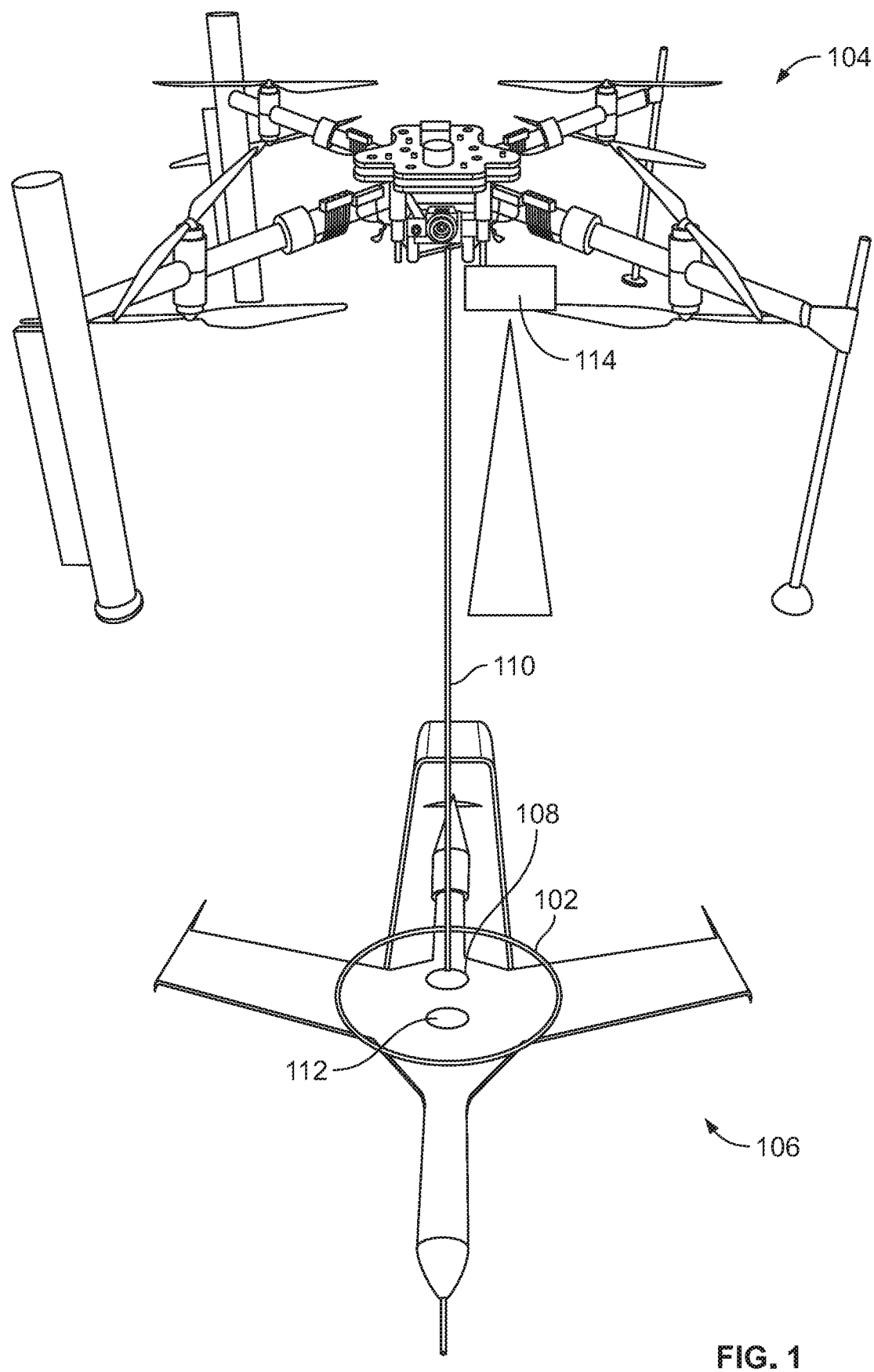
FIG. 1 illustrates an example magnetic capture mechanism constructed in accordance with teachings of this disclosure and shown in an example UAV capture system.

In general, the same reference numbers will be used throughout the drawing(s) and accompanying written description to refer to the same or like parts. The figures are not to scale. Stating that any part is in contact with another part means that there is no intermediate part between the two parts. Connecting lines or connectors shown in the various figures presented are intended to represent example functional relationships and/or physical or logical couplings between the various elements. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

There is a class of small fixed-wing UAVs that are designed to forgo the ability to land on runways. This allows for simpler design and weight savings. The weight savings can be used to carry heavier payload and/or more fuel for greater flight duration. Lacking the ability to land these fixed-wing UAVs requires a method of inflight capture for recovery. There are also times when a runway is not available for landing a UAV that is capable of landing on a runway. Existing capture methods include nets UAVs flies into, ropes that are hooked by a UAV (e.g., on a boat, in an area with poor road conditions, etc.). Since capture occurs at high speed with sudden deceleration, the recovery systems are designed to avoid damage to the UAV. Nets and hooked ropes allow for controlled deceleration and prevent impact with hard objects that might damage the UAV. In some disclosed examples, a magnetic docking mechanism is used. One part of the mechanism, a light steel plate, is mounted on the UAV, while a moving vehicle has the other part of the mechanism, which is the heavier magnet. The magnet is held on the moving vehicle, which matches speed with the UAV flown close to the vehicle. Teachings of this disclosure describe a mechanism that makes possible reliable docking to a UAV using a magnet in order to capture a UAV.

Docking two vehicles, one a UAV that can be affected by wind turbulence and the other a capture vehicle, which can be affected by rough surfaces, e.g. roads or waves, is difficult as the random motion can make it difficult to align the docking mechanism. Docking mechanisms typically require careful alignment before docking can occur. In contrast, the use of a magnet in disclosed example docking mechanisms benefit from such random motion. A magnet can be used as a docking mechanism to hold onto a light steel plate mounted on the UAV. However, rather than requiring precise alignment, as in the case of traditional docking mechanisms, the disclosed magnetic docking mechanism benefits from the random motion because they create opportunities for the mating surfaces to lock onto each other. Consequently, when the mating surfaces are brought into close proximity to each other the magnetic attraction will bring the two mating surfaces together upon random motions that reduce the distance of the mating surfaces or through manual or automated movement of the mating surfaces together. However, the traditional use of a wide magnet and steel plate for magnetic docking suffers from at least two problems. The first is that the magnetic dock can lock together with its mating surfaces offset from each other. In this event, the offset magnet and plate have sufficient strength to hold the UAV to prevent an abort of the capture but insufficient strength to securely hold onto the UAV for a successful capture. In this event, the UAV may be captured and then fall off the magnet and be damaged. The second problem is while the magnet may have sufficient strength, a magnet with a mating surface too small may allow the UAV to pry itself off of it. To address this problem the mating surfaces are made wide. To overcome at least these problems, disclosed example magnetic capture mechanisms use a self-centering ring. As a ring, the same amount of steel and magnetic material may be used as a solid disk or other shape, to ensure the same static holding strength, while the enlarged diameter better resists being pried apart. Disclosed self-centering arrangements bring capture members of a UAV and a capture vehicle into alignment responsive to the random relative movements of the UAV and the capturing device that naturally occur during flight of the UAV. Disclosed example self-centering arrangements, when not centered, can be readily disengaged. If during initial stages of docking, capture members of a UAV and a capture device are poorly aligned, they will be attracted with small amounts of magnetic force. During this stage of docking, random motions of the UAV and/or the capture vehicle can dislodge the UAV from the capture vehicle, allowing for another attempt at docking while the UAV is still capable of flight. When they become sufficiently close and centered, where the mating surfaces are parallel and rounded surface 406 meets the opposing straight surface 408, they become attracted with significant magnetic attraction (~1,000 lbs. of force) to securely, magnetically couple the UAV to the capture vehicle. The magnetically docked UAV needs to resist being pried apart due to air turbulence and rough surfaces that the capture vehicle experience. To limit the ability for inflight forces to separate a captured UAV apart from a capture vehicle (e.g., pry) the diameter of the self-centering mechanism can be increased, e.g., to greater than six or eight inches in diameter. This larger diameter or separation of the opposite surfaces enlarges the lever arm, increasing the resistance of the UAV to be pried off the magnetic docking mechanism. The magnetic material may be rare earth magnets, either formed into a ring or with individual magnets set into a ring. Another feature of the invention is the method to separate the magnetic and steel mating surfaces. Such a feature may be threaded bolts which push the mating surfaces apart. Toggle bolts may also be used to separate the mating surfaces. The magnetic attractive force of a dipole magnet to steel falls quickly with distance. For example, from a separation of 0.0625 mm to 10 mm the magnetic force may fall to one fiftieth the strength. With the mating surfaces thus separated, the UAV can be easily removed from the magnetic docking mechanism.

Reference will now be made in detail to non-limiting examples, some of which are illustrated in the accompanying drawings.

FIG. 1 illustrates an example magnetic capture mechanism 102 constructed in accordance with teachings of this disclosure, and shown being used by an example capture vehicle 104 to capture an example UAV 106. In the illustrated example, the example capture vehicle 104 is a quad-copter suitable to capture the UAV 106 from above, and place the UAV 106 on a desired surface. However, the example capture vehicle 104 may be any type of terrestrial vehicle (e.g., a truck with a boom, a marine vehicle with a boom, an aircraft, etc.) capable of capturing a UAV from above, from below, from a side, from a back, from a front, etc. In the illustrated example, the example UAV 106 is a fixed-wing terrestrial UAV captured from above by the capture vehicle 104. However, the example UAV 106 may be any form of terrestrial UAV, such as a fixed wing UAV, a rotary-wing UAV, a propelled UAV, etc., capable of capture by a capture vehicle from above, from below, from a side, from a back, from a front, etc.

The example magnetic capture mechanism 102 of FIG. 1 includes an example capture member 108 that is coupled to the capture vehicle 104 via, e.g., an example cable 110, a boom, an arm, a member, etc. During capture, the capture vehicle 104 is maneuvered, positioned, controlled, etc. to bring the example capture member 108 proximate (e.g., near, etc.) an example captured member 112 of the UAV 106. In the illustrated example, the length of the cable 110 and the location of the capture vehicle 104 relative to the UAV 106 are controlled by a person remotely controlling the capture vehicle 104 with the aid of a camera 114, a radar, a sonar, etc. However, in some examples, the capture vehicle 104 and/or the UAV 106 are autonomously controlled to bring the capture member 108 proximate the captured member 112.

In the nomenclature used herein, the capture vehicle 104 captures the UAV 106, and the capture vehicle 104 has the capture member 108 to capture the captured member 112 of the UAV 106. Thus, in illustrated examples, the capture member 108 has a magnetic portion 502 (see FIG. 5) that attracts (e.g., captures, draws, etc.) the captured member 112 of the UAV 106 toward the capture member 108 to capture the UAV 106. However, a UAV 106 could have a capture member 108 that captures a captured member 112 of a capture vehicle 104. Further still, the capture vehicle 104 and the UAV 106 can mutually attract each other's members 108, 112. However, to avoid magnetic interference with navigation systems, in at least some examples, the captured member 112 of a UAV 106 does not include magnetic material. Such effects may be handled by performing guidance system zeroing prior to flight.

Figure 2:
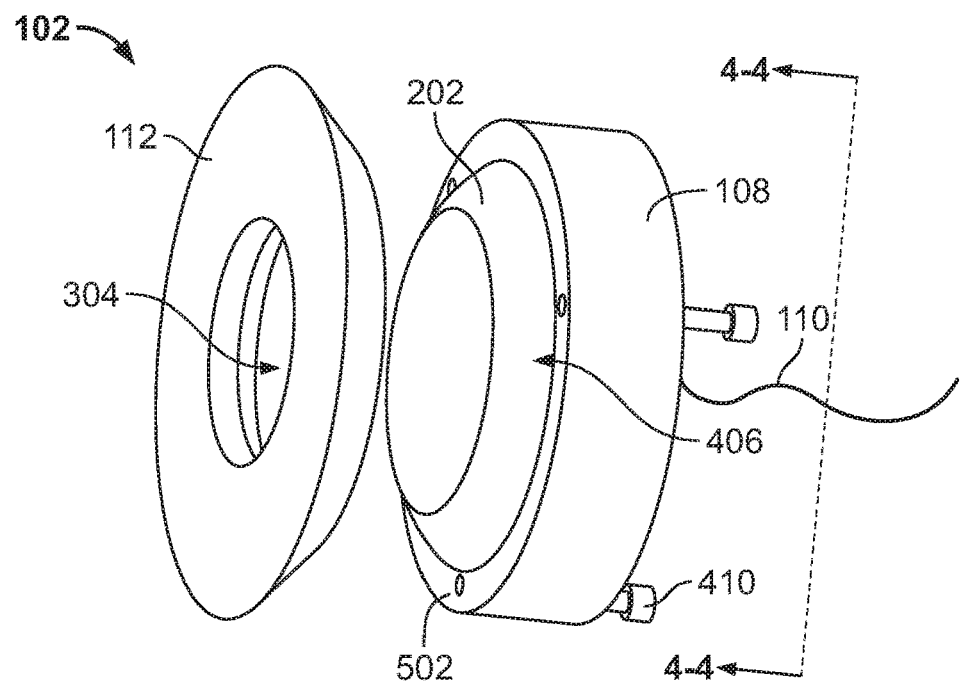
FIG. 2 is an orthographic perspective view of the example magnetic capture mechanism of FIG. 1.
Figure 3:
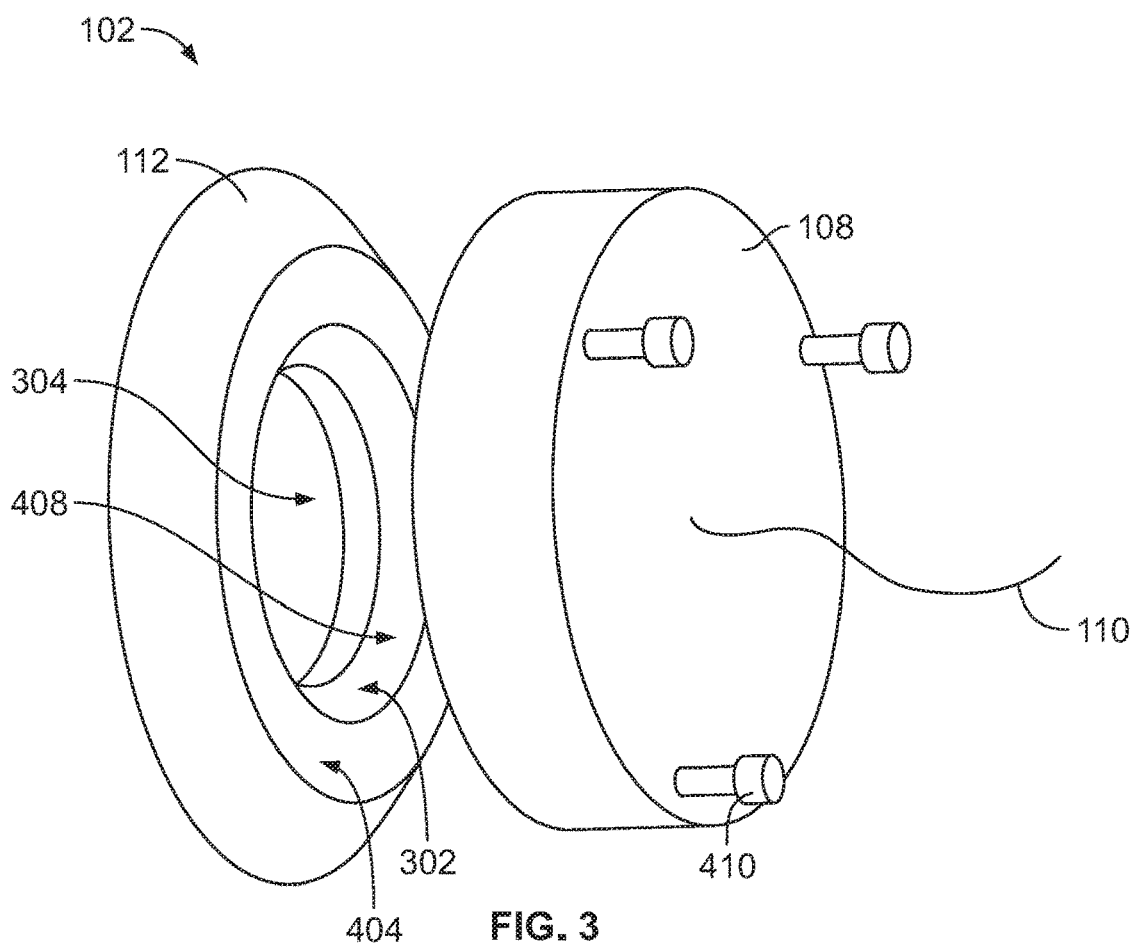
FIG. 3 is another orthographic perspective view of the example magnetic capture mechanism of FIG. 1.
Figure 4:
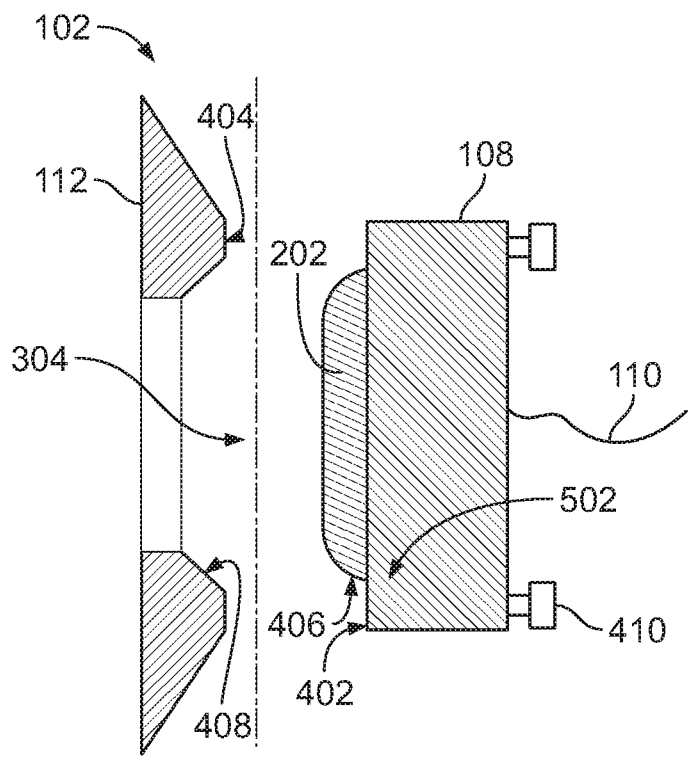
FIG. 4 is a side cross-sectional view of the example magnetic capture mechanism of FIG. 1.
Figures 5, 6:
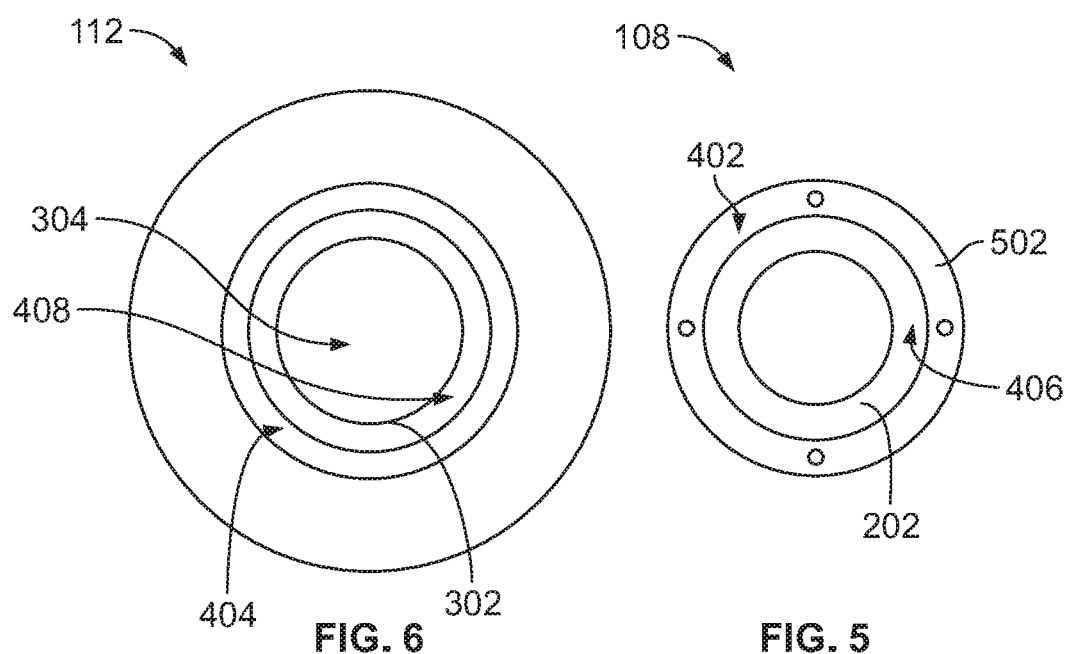
FIG. 5 is an end view of an example capture ring for the example magnetic capture mechanism of FIG. 1.
FIG. 6 is an end view of an example captured ring for the example magnetic capture mechanism of FIG. 1.

FIG. 2 is an orthographic perspective view of the example magnetic capture mechanism 102 of FIG. 1. FIG. 3 is another orthographic perspective view of the example magnetic capture mechanism 102 of FIG. 1. Shown in FIG. 2 and FIG. 3 are the capture member 108 and the captured member 112. FIG. 4 is a side cross-sectional view of the example magnetic capture mechanism of FIG. 1 shown along line 4-4 of FIG. 2. FIG. 5 is an end view of the example capture member 108 of FIG. 1. FIG. 6 is an end view of the example captured member 112.

The capture member 108 has a protruding portion 202 having a protruding shape (see FIG. 2) shaped to fit into (e.g., correspond to, match, etc.) a recessed portion 302 of the captured member 112 having a recessed shape (see FIG. 3), as seen in FIG. 4. Example shapes include, but are not limited to, having a curved profile, conical, frustoconical, etc. The shapes of the protruding portion 202 and the recessed portion 302 are selected to create an indentation and protrusion that fit each other. In some examples, the surface 408 has a straight slope to create a slide, and the shape of the opposing protruding portion 202 is selected to allow it to move smoothly down the slide. For example, a rounded protruding portion 202 allows greater imprecision in alignment as the protruding portion 202 contacts the recessed portion 302 with smaller diameter. When the protruding portion 202 and the recessed portion 302 are becoming aligned, are approaching alignment, are aligned, etc. (e.g., as shown in FIG. 4) and the capture member 108 and captured member 112 are brought into close proximity or contact, then a capturing magnetic force sufficient to capture (e.g., securely retain for planned, subsequent flight and landing operations) the captured member 112 can be provided. The magnetic force provided by the magnetic portion 502 of the capture member 108 (see FIG. 5) outside the protruding portion 202 magnetically attracts a mating surface 402 of the capture member 108 into contact with a mating surface 404 of the captured member 112, thereby capturing the captured member 112. That is, while the example capture member 108 has the protruding portion 202, and the captured member 112 has the recessed portion 302 in the illustrated examples, the capture member 108 may have a recessed portion and the captured member 112 may have a protruding portion. In some examples, the captured member 112 is formed of steel, with a layer of a lightweight material (e.g., a hard plastic such as Delrin) between the captured member 112 and the body of the UAV. The layer of lightweight material may also be a steel plate where much of the steel is machined away leaving support material, e.g., in concentric rings or spokes radiating from the center. The thickness of the captured member 112 may be selected based on a desired amount of magnetic attraction.

Because the weight of the capture member 108 typically isn't a consideration, the protruding portion 202 could be solid and formed of smooth steel. The protruding portion 202 doesn't have to be formed of magnetic material. It could be attached to the magnetic portion 502 and centered onto it. Example dimensions are a two inch thick and eight inch diameter magnetic portion 502, and a one inch thick capture member 112 to reduce interference with aerodynamics of the UAV 106.

Figure 7:
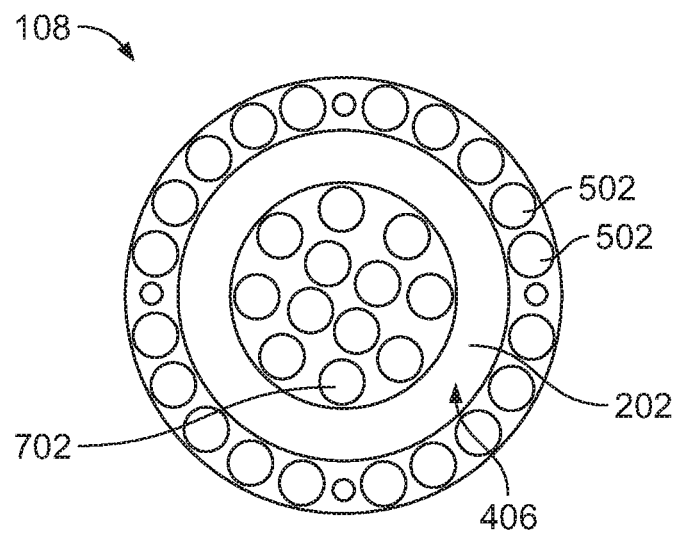
FIG. 7 is an end view of an example capture ring for the example magnetic capture mechanism of FIG. 1.

In some examples, the magnetic portion 502 is an annular region of magnetic material arranged about the protruding portion 202. Additionally and/or alternatively, a plurality of magnetic portions 502 arranged about the protruding portion 202 are used (e.g., arranged in a ring as shown in FIG. 7). In some examples, magnetic portions 702 are additionally placed within the protruding portion 202 of the capture member 108 (e.g., see FIG. 7) that attract a portion of the captured member 112 within the recessed portion 302 of the captured member 112. That is, a captured member 112 that does not have a central aperture 304 (see FIG. 3). In some examples, the magnetic portions 502, 702 are formed of rare earth magnetic material (e.g., neodymium). Other arrangements of magnetic material (e.g., squares, hexagons, octagons, etc.) may be used, possibly at the expense of magnetic force varying with rotation of a capture vehicle 104 relative to a UAV 106.

Figure 8:
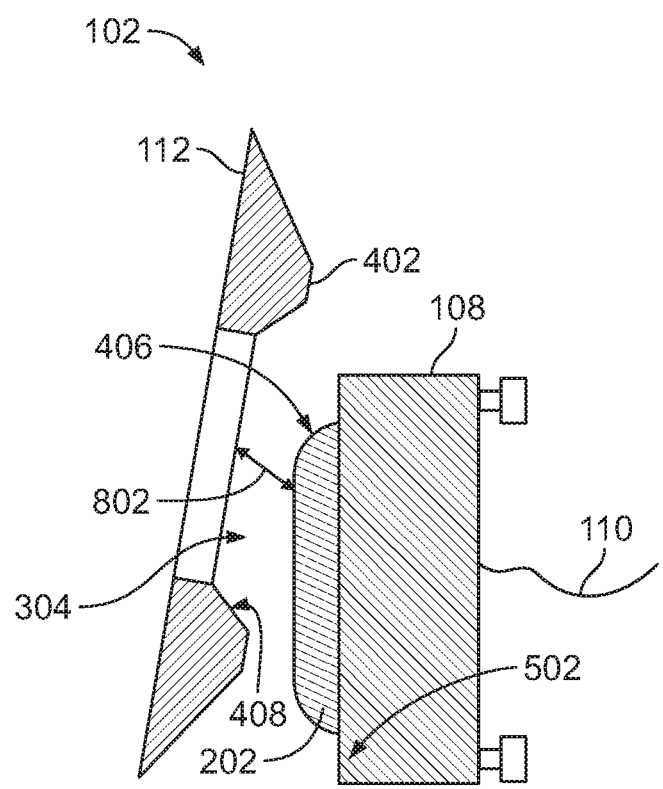
FIG. 8 is another side cross-sectional view of the example magnetic capture mechanism of FIG. 1 during an example operation of use.

FIG. 8 is a side cross-section view of the capture member 108 and the captured member 112 when they are not aligned, e.g., during a capture process. Because, as shown in FIG. 8, the capture member 108 and the captured member 112 are not aligned, the magnetic portion 502 is not sufficiently aligned to apply enough magnetic force to capture the captured member 112. As the capture member 108 and the captured member 112 move during capture (e.g., due to positioning of the capture vehicle 104 and/or the UAV 106, buffeting, winds, etc.) their movement can easily overcome any magnetic force that has been established, and cause surfaces 406 (see FIG. 4 and FIG. 8) of the protruding portion 202 to come into incidental contact 802 with a surface 408 of the recessed portion 302. The incidental contact 802 causes the protruding portion 202 and the recessed portion 302 to mutually self-align to each other over time responsive to the incidental contact. When they become aligned and in close proximity (e.g., close, near, proximate contact, near contact, in contact, etc.), then the magnetic portion 502 is able to magnetically capture the captured member 112. In some examples, the capture member 108 and/or the captured member 112 are purposefully moved to cause (e.g., purposefully caused) at least a portion of the incidental contact 802. For example, one or more operations of the capture vehicle 104 and/or the UAV 106 is modified to move the capture vehicle 104, the UAV 106, the capture member 108 and/or the captured member 112 back and forth, forward and backward, etc. according to one or more of a random pattern, a pseudo-random pattern, a regular pattern, etc.

To separate the capture vehicle 104 and the UAV 106, the example magnetic capture mechanism 102 of FIG. 1 includes one or more members (e.g., bolts 410) that can be extended from, through, etc. the mating surface 402 of the capture member 108 against the mating surface 404 of the captured member 112 (see FIG. 4). The bolts 410 can be extended to apply a mechanical force sufficient to overcome the magnetic force applied by the capture member 108 thereby, separating the captured member 112 from the capture member 108. The example bolts 410 can be threaded and extended by rotation, be pushed by an actuator, etc. In some examples, the bolts 410 are used to separate the captured member 112 from the capture member 108 once the combination is stationary on the ground, a marine vehicle, a motor vehicle, etc. Additionally, and/or alternatively, the bolts 410 can be used to separate the captured member 112 from the capture member 108 once the captured member 112 is in the air and flying at a desired speed and direction.

While an example magnetic capture mechanism 102 is illustrated in FIGS. 1-7, one or more of the elements, processes and/or devices illustrated in FIGS. 1-7 may be combined, divided, re-arranged, omitted, eliminated and/or implemented in any other way.

Figure 9:
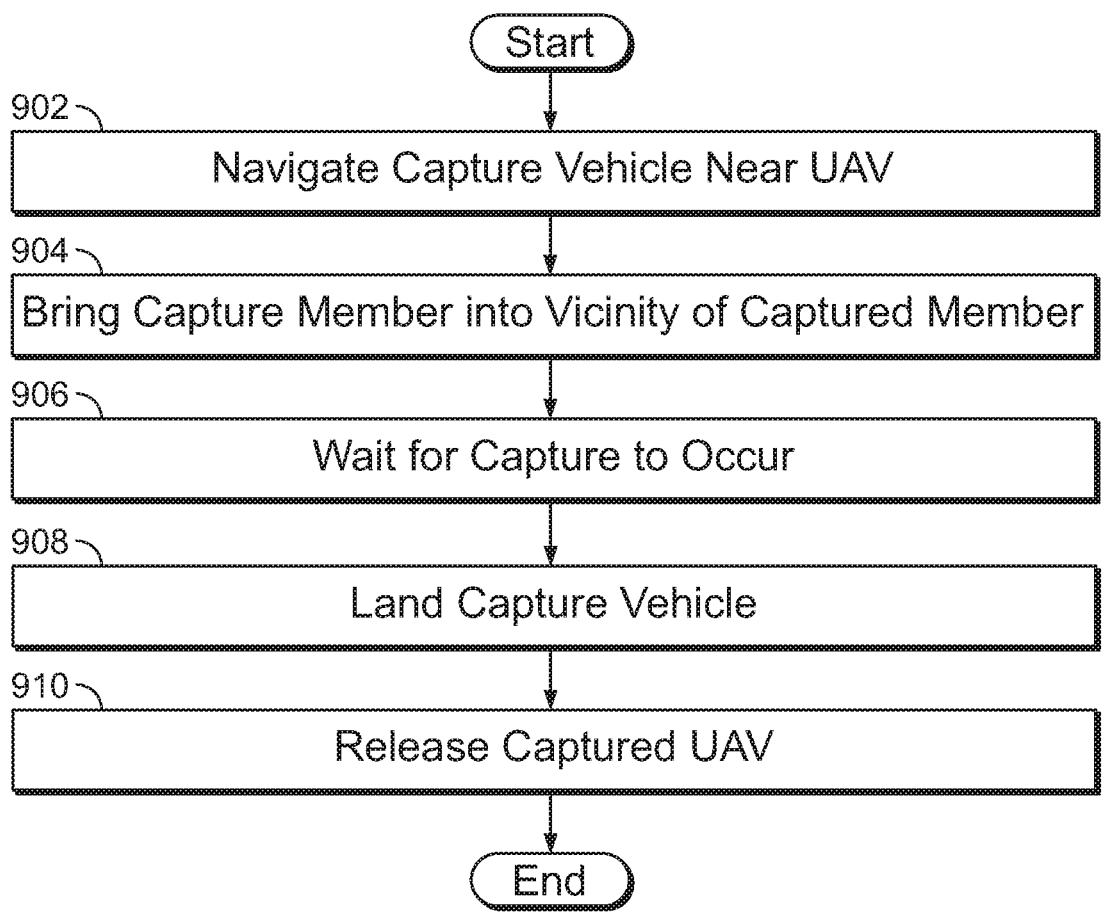
FIG. 9 is a flowchart representative of example hardware logic or machine-readable instructions for capturing a UAV according to examples disclosed herein.

A flowchart representative of example hardware logic, machine-readable instructions, hardware implemented state machines, and/or any combination thereof for implementing the example capture vehicle 104, and/or a device controlling the capture vehicle 104 of FIG. 1 is shown in FIG. 9. The machine-readable instructions may be an executable program or portion of an executable program for execution by a computer processor such as the processor 1010 shown in the example processor platform 1000 discussed below in connection with FIG. 10. The program may be embodied in software stored on a non-transitory computer-readable storage medium such as a compact disc read-only memory (CD-ROM), a floppy disk, a hard drive, a digital versatile disk (DVD), a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowchart illustrated in FIG. 9, many other methods of implementing the example capture vehicle 104, and/or a device controlling the capture vehicle 104 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, a field programmable gate array (FPGA), an application specific integrated circuit (ASIC), a comparator, an operational-amplifier (op-amp), a logic circuit, etc.) structured to perform the corresponding operation without executing software or firmware.

As mentioned above, the example processes of FIG. 9 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 9 begins at block 902 with the capture vehicle 104 being navigated near to the UAV 106 (block 902). The capture member 108 of the capture vehicle 104 is then brought into the vicinity of the captured member 112 of the UAV 106 (block 904). A period of time is allowed for incidental contact between the capture member 108 and the captured member 112 to cause the capture member 108 to capture the captured member 112 (block 906). The capture vehicle 104 together with the captured UAV 106 is landed (block 908), and the captured UAV 106 is released from the capture vehicle 104 using the example bolts 410 (block 910). Control then exits from the example program of FIG. 9.

Figure 10:
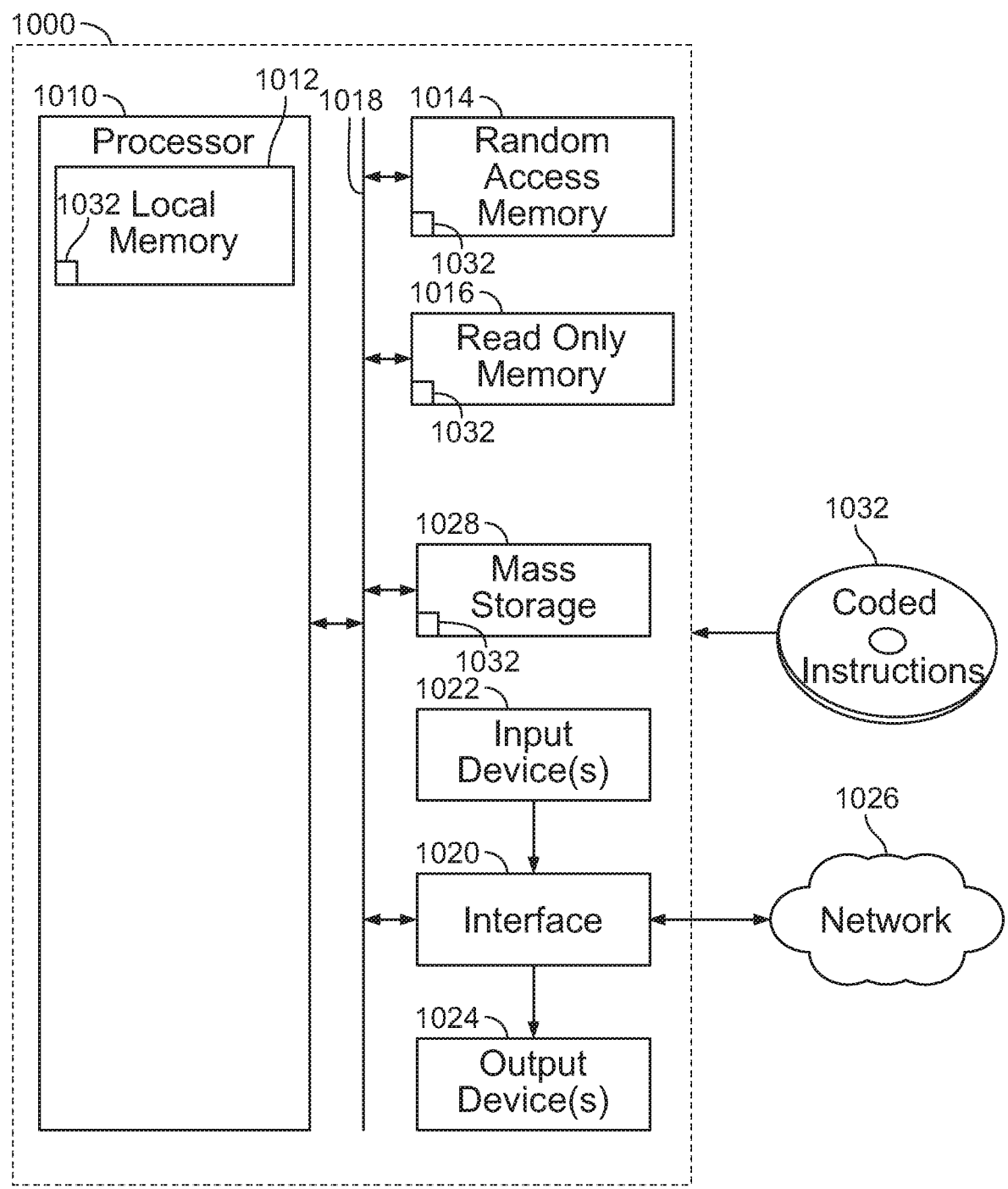
FIG. 10 illustrates an example processor platform structured to execute the example machine-readable instructions of FIG. 9 to capture a UAV.

FIG. 10 is a block diagram of an example processor platform 1000 structured to, possibly among other things, execute the instructions of FIG. 9 to, among other things, control the docking of the example capture vehicle 104 of FIG. 1 with the UAV 106. The processor platform 1000 may be implemented together with the capture vehicle 104, and/or be remote from the capture vehicle 104. In some examples, the processor platform 1000, under the manual control of an operator, controls the example capture vehicle 104 to dock with the UAV 106. The processor platform 1000 can be, for example, a server, a computer, a workstation, a microcontroller, or any other type of computing device.

The processor platform 1000 of the illustrated example includes a processor 1010. The processor 1010 of the illustrated example is hardware. For example, the processor 1010 can be implemented by one or more integrated circuits, logic circuits, microprocessors, graphics processing units (GPUs), digital signal processors (DSPs), or controllers from any desired family or manufacturer. The hardware processor may be a semiconductor based (e.g., silicon based) device.

The processor 1010 of the illustrated example includes a local memory 1012 (e.g., a cache). The processor 1010 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the volatile memory 1014 and the non-volatile memory 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a peripheral component interconnect (PCI) express interface.

In the illustrated example, one or more input devices 1022 are connected to the interface circuit 1020. The input device(s) 1022 permit(s) a user to enter data and/or commands into the processor 1010. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, and/or any other network interface to facilitate exchange of data with external machines (e.g., computing devices of any kind) via a network 1026. The communication can be via, for example, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, CD drives, Blu-ray disk drives, redundant array of independent disks (RAID) systems, and DVD drives.

Coded instructions 1032 including the coded instructions of FIG. 9 may be stored in the mass storage device 1028, in the volatile memory 1014, in the non-volatile memory 1016, and/or on a removable non-transitory computer-readable storage medium such as a CD-ROM or a DVD.

Example magnetic capture systems and mechanisms for UAVs are disclosed herein. Further examples and combinations thereof include at least the following.

Example 1 is a capture mechanism for an unmanned aerial vehicle (UAV) that includes a first member attached to a capture vehicle, the first member having a first portion having a first shape and a magnetic portion, and a second member attached to the UAV, the second member having a second portion having a second shape, wherein the first member and the second member mutually self-align responsive to incidental contact of the first shape and the second shape, and the magnetic portion is to capture the second member.

Example 2 is the capture mechanism of example 1, wherein the magnetic portion is to capture the UAV as the first member and the second member become aligned.

Example 3 is the capture mechanism of example 1, wherein the first shape is a protruding shape and the second shape is a recessed shape.

Example 4 is the capture mechanism of example 3, wherein the first shape is a frustoconical shape.

Example 5 is the capture mechanism of example 3, wherein the first member has a first mating surface, the second member has a second mating surface associated with the magnetic portion, and the magnetic portion applies a capturing magnetic force to the first member when the first mating surface and the second mating surface come into proximate contact.

Example 6 is the capture mechanism of example 5, wherein, when the first shape and the second shape are not aligned, the capturing magnetic force is prevented from capturing the first member.

Example 7 is the capture mechanism of example 1, wherein at least one of the capture vehicle, or UAV is purposefully moved to cause at least a portion of the incidental contact.

Example 8 is the capture mechanism of example 7, wherein the purposeful movement of the at least one of the capture vehicle, or the UAV moves at least one of the first member, or the second member according to at least one of a random pattern, a pseudo-random pattern, or a regular pattern to cause the at least a portion of the incidental contact.

Example 9 is the capture mechanism of example 1, further including one or more members to extend at least one of from or through at least one of the first member or the second member to separate the first member from the second member.

Example 10 is the capture mechanism of example 9, wherein the one or more members are one or more bolts extending through the first member.

Example 11 is the capture mechanism of example 1, wherein the first member is attached to the capture vehicle via at least one of a cable or a boom.

Example 12 is a method of capturing an unmanned aerial vehicle (UAV) with a capture vehicle that includes navigating the capture vehicle to position a first member attached to the capture vehicle near a second member attached to the UAV, and waiting a period of time for incidental contact of the first member and the second member to mutually self-align the first member and the second member, wherein, when the first member and the second member are not becoming aligned, no magnetic force is used to capture the first member.

Example 13 is the method of example 12, wherein the first member has a first mating surface, the second member has a second mating surface associated with a magnetic portion, and the magnetic portion applies a capturing magnetic force to the first member when the first mating surface and the second mating surface come into contact.

Example 14 is the method of example 12, further including extending one or more bolts through the first member to separate the UAV from the capture vehicle.

Example 15 is the method of example 12, further including purposefully moving at least one of the capture vehicle, or the UAV according to at least one of a random pattern, a pseudo-random pattern, or a regular pattern to cause at least a portion of the incidental contact.

Example 16 is the method of example 12, wherein the first member has a protruding portion and the second member has a recessed portion.

Example 17 is a non-transitory computer-readable storage medium comprising instructions that, when executed, cause a machine to navigate a capture vehicle to position a first member attached to the capture vehicle near a second member attached to an unmanned aerial vehicle (UAV), and wait a period of time for incidental contact of the first member and the second member to mutually self-align the first member and the second member, wherein a magnetic portion of the first member is to capture the second member as the first member and the second member become aligned.

Example 18 is the non-transitory computer-readable storage medium of example 17, wherein the first member has a first mating surface, the second member has a second mating surface associated with the magnetic portion, and the magnetic portion applies a capturing magnetic force to the first member when the first mating surface and the second mating surface come into proximate contact.

Example 19 is the non-transitory computer-readable storage medium of example 17, wherein, when the first member and the second member are not aligned, a capturing magnetic force is prevented from capturing the first member.

Example 20 is the non-transitory computer-readable storage medium of example 17 including further instructions that, when executed, cause the machine to move at least one of the capture vehicle, or the UAV according to at least one of a random pattern, a pseudo-random pattern, or a regular pattern to cause at least a portion of the incidental contact.

Any references, including publications, patent application publications, and patents cited herein are hereby incorporated in their entirety by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A capture mechanism for an unmanned aerial vehicle (UAV), the capture mechanism comprising:
    a first member attached to a capture vehicle, the first member including a first portion having a protruding shape and a magnetic portion, the protruding shape having a converging tip proximate a distal end of the protruding shape; and
    a second member attached to the UAV, the second member including a second portion having a recessed shape with a converging opening that converges in a direction toward the UAV, wherein the first member and the second member mutually self-align responsive to incidental contact of the protruding shape and the recessed shape, the first member and the second member to mutually self-align by the converging tip being guided by the converging opening, and wherein the magnetic portion is to capture the second member.

2. The capture mechanism of claim 1, wherein the magnetic portion is to capture the UAV as the first member and the second member become aligned.

3. The capture mechanism of claim 1, wherein the protruding shape is a frustoconical shape.

4. The capture mechanism of claim 1, wherein the first member has a first mating surface, the second member has a second mating surface associated with the magnetic portion, and the magnetic portion applies a capturing magnetic force to the first member when the first mating surface and the second mating surface come into proximate contact.

5. The capture mechanism of claim 1, wherein, when the protruding shape and the recessed shape are not aligned, the capturing magnetic force is prevented from capturing the first member.

6. The capture mechanism of claim 1, wherein at least one of the capture vehicle, or UAV is moved to cause at least a portion of the incidental contact.

7. The capture mechanism of claim 6, wherein the movement of the at least one of the capture vehicle or the UAV moves at least one of the first member or the second member according to at least one of a random pattern, a pseudo-random pattern, or a regular pattern to cause the at least a portion of the incidental contact.

8. The capture mechanism of claim 1, further including one or more members to extend at least one of from or through at least one of the first member or the second member to separate the first member from the second member.

9. A capture mechanism for an unmanned aerial vehicle (UAV), the capture mechanism comprising:
a first member attached to a capture vehicle, the first member having a first portion with a first shape and a magnetic portion;
a second member attached to the UAV, the second member having a second portion with a second shape, wherein the first member and the second member mutually self-align responsive to incidental contact of the first shape and the second shape, and the magnetic portion is to capture the second member; and
one or more members to extend at least one of from or through at least one of the first member or the second member to separate the first member from the second member, wherein the one or more members are one or more bolts extending through the first member.

10. The capture mechanism of claim 1, wherein the first member is attached to the capture vehicle via at least one of a cable or a boom.

11. A method of capturing an unmanned aerial vehicle (UAV) with a capture vehicle, the method comprising:
navigating the capture vehicle to position a first member attached to the capture vehicle near a second member attached to the UAV, the first member having a protruding shape with a converging tip proximate a distal end of the protruding shape, the second member having a recessed shape with a converging opening that converges in a direction toward the UAV; and
waiting a period of time for incidental contact of the first member and the second member to mutually self-align the first member and the second member, the first member and the second member to mutually self-align by the converging tip being guided by the converging opening wherein, when the first member and the second member are not becoming aligned, a magnetic force associated with a magnetic portion of the first member and the second member is insufficient to capture the second member.

12. The method of claim 11, wherein the first member has a first mating surface, the second member has a second mating surface associated with a magnetic portion, and the magnetic portion applies a capturing magnetic force to the first member when the first mating surface and the second mating surface come into contact.

13. A method of capturing an unmanned aerial vehicle (UAV) with a capture vehicle, the method comprising:
navigating the capture vehicle to position a first member attached to the capture vehicle near a second member attached to the UAV;
waiting a period of time for incidental contact of the first member and the second member to mutually self-align the first member and the second member, wherein, when the first member and the second member are not becoming aligned, no significant amount of magnetic force is used to capture the first member; and
extending one or more bolts through the first member to separate the UAV from the capture vehicle.

14. The method of claim 11, further including moving at least one of the capture vehicle, or the UAV according to at least one of a random pattern, a pseudo-random pattern, or a regular pattern to cause at least a portion of the incidental contact.

15. A non-transitory computer-readable storage medium comprising instructions that, when executed, cause at least one processor to:
navigate a capture vehicle to position a first member attached to the capture vehicle near a second member attached to an unmanned aerial vehicle (UAV), the first member having a protruding shape with a converging tip proximate a distal end of the protruding shape, the second member having a recessed shape with a converging opening that converges in a direction toward the UAV; and
wait a period of time for incidental contact of the first member and the second member to mutually self-align the first member and the second member, the first member and the second member to mutually self-align by the converging tip being guided by the converging opening, wherein a magnetic portion of the first member is to capture the second member as the first member and the second member become aligned.

16. The non-transitory computer-readable storage medium of claim 15, wherein the first member has a first mating surface, the second member has a second mating surface associated with the magnetic portion, and the magnetic portion applies a capturing magnetic force to the first member when the first mating surface and the second mating surface come into proximate contact.

17. The non-transitory computer-readable storage medium of claim 15, wherein, when the first member and the second member are not aligned, a capturing magnetic force is prevented from capturing the first member.

18. The non-transitory computer-readable storage medium of claim 15 including further instructions that, when executed, cause the at least one processor to move at least one of the capture vehicle, or the UAV according to at least one of a random pattern, a pseudo-random pattern, or a regular pattern to cause at least a portion of the incidental contact.

19. The capture mechanism of claim 1, wherein the magnetic portion is shaped as a ring that surrounds the protruding shape.

20. The capture mechanism of claim 1, wherein the second member includes a diverging outer edge at its diametric periphery.

21. The capture mechanism of claim 1, wherein the first member includes a first flat surface to mate with a second flat surface of the second member.

22. The capture mechanism of claim 1, wherein the magnetic portion is to cause the converging tip to be inserted into the converging opening.

* * * * *